United States Patent [19]

Ito et al.

[11] 3,836,715

[45] Sept. 17, 1974

[54] DECODER FOR USE IN 4-2-4 MATRIX PLAYBACK SYSTEM

[75] Inventors: Ryosuke Ito; Susumu Takahashi, both of Tokyo, Japan

[73] Assignee: Sansui Electric Co., Ltd., Tokyo, Japan

[22] Filed: Sept. 4, 1973

[21] Appl. No.: 394,107

[30] Foreign Application Priority Data

Sept. 9, 1972 Japan .............................. 47-90591

[52] U.S. Cl. .................... 179/1 GQ, 179/100.4 ST, 179/100.1 TD

[51] Int. Cl. .............................................. H04r 5/04

[58] Field of Search ........ 179/1 GQ, 1 G, 100.4 ST, 179/100.1 TD, 15 BT

[56] References Cited

UNITED STATES PATENTS 3,786,193 1/1974 Tsurushima .................... 179/1 GQ

*Primary Examiner*—Kathleen H. Claffy
*Assistant Examiner*—Thomas D'Amico
*Attorney, Agent, or Firm*—Harris, Kern, Wallen & Tinsley

[57] ABSTRACT

A decoder is provided with variable matrixes capable of improving separation characteristics of four outputs. Two channel signals are divided by filters into a plurality of frequency bands, and the variable matrix is provided for each band to assure a better operation of each variable matrix.

8 Claims, 5 Drawing Figures

DECODER FOR USE IN 4-2-4 MATRIX PLAYBACK SYSTEM

This invention relates to a decoder suitable for a matrix four channel system.

The inventors have early proposed a decoder — entitled DECODER FOR USE IN 4-2-4 MATRIX PLAYBACK SYSTEM filed Dec. 19, 1972 under the U.S. application Ser. No. 298,933 — capable of improving inherent poor separation characteristics in a matrix four channel system. A prior art decoder includes at least one control unit for generating control outputs in response to two channel signals and a variable matrix circuit for receiving the two channel signals and generating four two-channel signal intermixed outputs such that a relative amplitude ratio between the two channel signals of the respective intermixed outputs is varied in response to the control outputs. The control unit includes a phase descriminator for detecting a phase relation of the two channel signals by a phase difference between the two channel signals or a level comparator for detecting a phase relation of the two channel signals by a level difference between a sum and a difference of the two channel signals. The control unit is designed to produce first and second control outputs. With the above-mentioned decoder the control unit is adapted to receive the two channel signals over the entire audible frequency range. The same is the case with the variable matrix circuit. Two channel signals L and R suitable for the decoder can be expressed as follows:

$$L = LF + \Delta RF + jLB + j\Delta RB$$
$$R = RF + \Delta LF - jRB - j\Delta LB \qquad (1)$$

in which LF, RF, LB and RB represent audio input signals respectively associated with left-front, right-front, left-back and right-back channels; Δ denotes a matrix coefficient whose typical value is 0.414; and $j$ denotes that the back signals LB and RB are 90° phase shifted relative to the front signals LF and RF.

As will be apparent from the expression (1), where only the front signals are present, the two channel signals L and R are in phase. In this case, the control unit produces a positive first output and negative second output, viewed from a reference level. Where the back signals alone are present, the two channel signals L and R are opposite in phase or 180° out of phase. In this case, the control unit produces a negative first output and positive second output, viewed from the reference level. Where LF = RF = LB = RB, a phase difference between the two channel signals L and R is 90°. In this case, the first and second outputs of the control unit are both in the same level or reference level.

Suppose that the same level signals different in frequency from each other are concurrently present in the confronting or diagonal two channels, for example, in the LF channel and RB channel; for example, a signal of 1 kHz is present in the LF channel and a signal of 4 kHz is concurrently present in the RB channel. Then, signals L and R are in phase with respect to the LF channel and signals L and R are opposite in phase with respect to the RB channel. For this reason, a first output of the control unit corresponding to the LF signal tends to be positive and a second output of the control unit corresponding to the LF signal tends to be negative, while a first output of the control unit corresponding to the RB signal tends to be negative and a second output of the control unit corresponding to the RB signal tends to be positive. The first and second outputs, therefore, involve cancellation so that the same level is attained, and a better control of the variable matrix circuit can not be realized. In this way, when the two signals having a relatively great frequency difference are concurrently present, the variable matrix circuit sometimes undergoes an average control and a poor separation characteristic results. When such a thing happens in the case where a frequency difference is relatively great, an unnatural feeling is given to the listener from the acoustical point of view. The same thing is also true of the other two confronting channels i.e. the RF channel and the LB channel, the center-front channel CF and the center-back CB, and the center-left channel CL and the center-right channel CR.

An object of this invention is to provide a decoder capable of obviating the above drawbacks and having a better operable variable matrix circuit.

According to this invention there is provided a decoder for use in a multi-directional acoustic system in which at least four directional audio input signals associated with front-left and right channels and rear-left and right channels are encoded into two channel signals and the two channel signals are decoded into at least four audio output signals, said decoder comprising: filter means for dividing said two channel signals into at least first and second frequency bands; at least one first control unit connected to receive the two channel signals of the first frequency band to generate control outputs for detecting a phase relation between the two channel signals to produce control outputs; first variable matrix circuit means connected to receive the two channel signals of the first frequency band and adapted to generate four two-channel signal intermixed outputs such that relative amplitude ratios between the two channel signals are varied in response to control outputs from said control unit; at least one second control unit connected to receive the two channel signals of the second frequency band and for detecting a phase relation between the two channel signals to produce control outputs; second variable matrix circuit means connected to receive the two channel signals of the second frequency band and adapted to generate four two-channel signal intermixed outputs such that relative amplitude ratios between the two channel signals are varied in response to control outputs from said second control unit; and means for combining together the corresponding outputs from said first and second variable matrix circuit means.

According to this invention, each variable matrix circuit is designed to receive two channel signals closer in frequency to each other within a predetermined frequency band. Even if the variable matrix circuit undergoes an average control based on two signals near in frequency to each other with the predetermined frequency band, an unnatural feeling given to the listener is markedly reduced from the acoustical view point, as compared with the case where two signals more distant in frequency from each other are involved.

This invention can be more fully understood from the following detailed description when taken in connection with reference to the accompanying drawings, in which.

Figure 1:
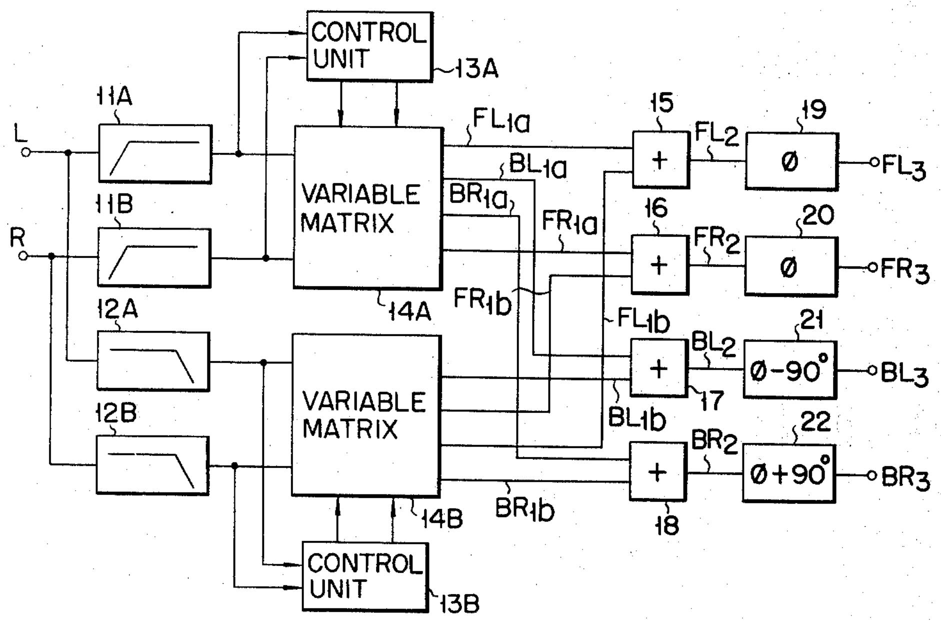
FIG. 1 is a block diagram showing one embodiment of a decoder according to this invention.

As shown in FIG. 1 two channel signals L and R are divided, for example, into two frequency bands by low-pass filters 11A and 11B and high-pass filters 12A and 12B. The low-pass and high-pass filters may be designed to have such characteristics that the former permits a passage of low frequency two channel signals L and R of, for example, less than about 3 kHz while the latter permits a passage of high frequency two channel signals L and R of more than 3 kHz. The two channel signals L and R may, of course, be divided into three frequency bands, i.e. low frequency band (for example, less than 800 Hz), medium frequency band (800 Hz – 5 kHz) and high frequency band (more than 5 kHz), or more bands.

The low frequency two channel signals L and R from the low-pass filters 11A and 11B are fed to a first control unit 13A and a first variable matrix 14A, while the high frequency two channel signals L and R from the high-pass filters are fed to a second control unit 13B and a second variable matrix 14B. The first variable matrix 14A is controlled by control outputs from the first control unit 13A to produce four outputs FL1a, FR1a, BL1a and BR1a, and the second variable matrix 14B is controlled by control outputs from the second control unit 13B to produce outputs FL1b, FR1b, BL1b and BR1b. The corresponding outputs from the first and second variable matrixes 14A and 14B are additively combined at the adders 15, 16, 17 and 18 to produce outputs FL2, FR2, BL2 and BR2 respectively. The outputs FL2, FR2, BL2 and BR2 may be phase-shifted by phase shifters 19, 20, 21 and 22 to generate four-channel signals FL3, FR3, BL3 and BR3 to be supplied to amplifiers and loudspeakers (not shown).

The phase shifters 19 and 20 may have substantially the same phase shift characteristic with respect to each other over the entire audible frequency range, and the phase shifter 21 has a phase shift characteristic −90° displaced from that of the phase shifters 19 and 20 and the phase shifter 22 has a phase shift characteristic +90° displaced from that of the phase shifters 19 and 20. These phase shifters introduce a suitable phase relation into four loudspeaker signals. However, this does not constitute part of the subject matter of this invention.

Figure 2:
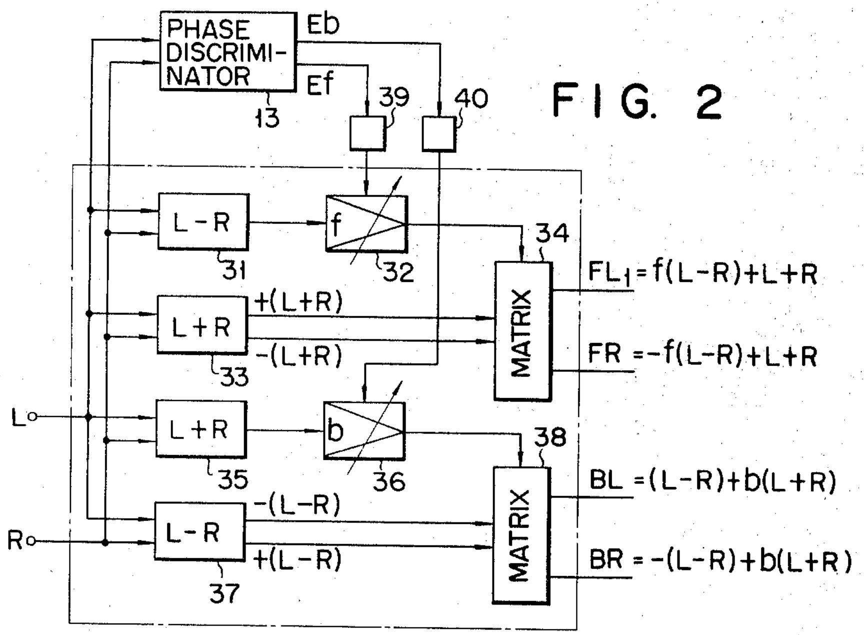
FIG. 2 is a block diagram showing one example of a variable matrix circuit.

The first and second variable matrix circuits 14A and 14B shown in FIG. 1 may be constituted as shown in FIG. 2. In FIG. 2 a difference signal L − R between two channel signals L and R is produced at a matrix 31 and the difference signal is fed to a variable gain amplifier 32. The gain $f$ of the variable gain amplifier 32 is controlled by first output Ef from a control unit or phase discriminator. Two sum signals +(L + R) and −(L + R) opposite in polarity to each other are produced at a matrix 33. The output $f$(L − R) of the variable gain amplifier 32, together with the sum signals +(L + R) and −(L + R), is fed to a matrix 34. In the matrix 34 the signal $f$(L − R) and signals L and R are added. With the same polarity to produce FL1$a$ = f(L − R) + L + R, and the signal f(L − R) and signals L and R are added with the opposite polarity to generate FR1$a$ = −$f$(L − R) + L + R. Further, a sum signal L + R is produced at a matrix 35. The sum signal L + R is fed to a variable gain amplifier 36. The gain $b$ of the variable gain amplifier 36 is controlled by a second output E$b$ of a phase discriminator. Two difference signals +(L − R) and −(L − R) opposite in polarity to each other are produced at a matrix 37. The difference signals +(L − R) and −(L − R), together with an output $b$(L + R) of the variable gain amplifier 36, are fed to a matrix 38. In the matrix 38, the signal $b$(L + R) and signal L are added, with the opposite polarity of the signal R, to produce BL1a = (L − R) + $b$(L + R). The signal $b$(L + R) and signal R are applied, with the opposite polarity to a signal L, to generate BR1a = −(L − R) + b(L + R).

A variable matrix shown in FIG. 2 is of a simple construction applicable to improve separation between front channels or rear channels. The gains $f$ and $b$ of the variable gain amplifiers 32 and 36 are varied in a direction opposite to each other in a range between 0 and 2.414. Reference numerals 39 and 40 are correction circuits each provided with diode, resistors and a bias voltage source. The correction circuits are so arranged that the factors $f$ and $b$ are varied asymmetrically in the positive and negative directions i.e. the factors $f$ and $b$ are varied, viewed from the reference level, in the positive direction to the extent ranging between 1 and 2.414, for example, and in the negative direction to the extent ranging between 0 and 1.

Figure 3:
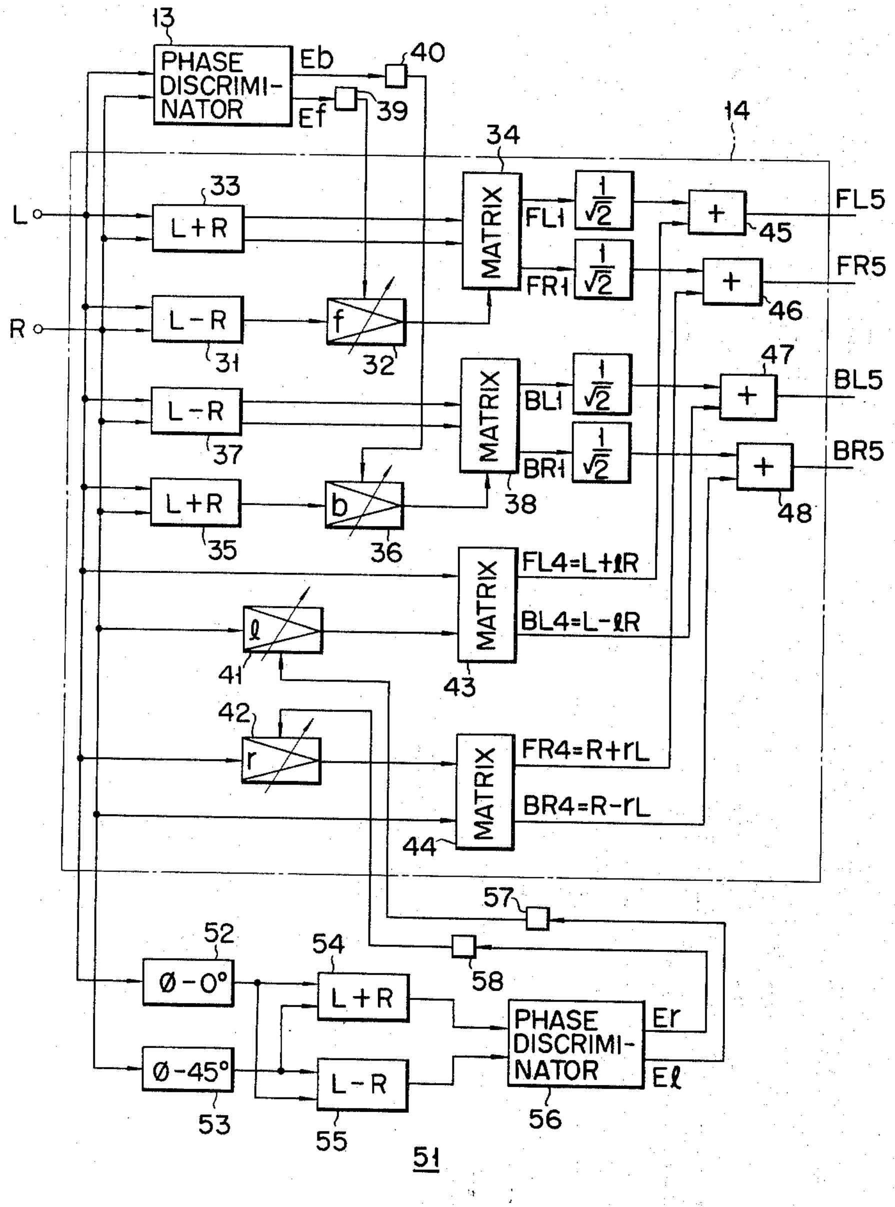
FIG. 3 is a systematic representation showing another example of a variable matrix circuit in which phase discriminators are used as control units.

FIG. 3 shows one example of a variable matrix capable of controlling four channels independently, in which the same reference characters as in FIG. 2 are used to designate like parts or elements. With this embodiment, a control unit 51 is additively provided. The control 51 performs between left and rear signals L and R by comparison of phase difference between the sum and difference signals of the signals L and R and includes phase shifters 52 and 53 for introducing a phase difference of −45° between signals L and R, matrixes 54 and 55 for generating sum and difference signals from the outputs of the phase shifters 52 and 53, and a phase discriminator 56 for detecting a phase difference between the sum and difference signals. A first control output E$l$ is utilized through a correction circuit 57 to control a gain $l$ of a variable gain amplifier 41 for receipt of a signal R, and a second control output E$r$ is utilized through a correction circuit 58 to control a gain $r$ of a variable gain amplifier 42 for receipt of a signal L. A signal L and an output signal $l$R of the variable gain amplifier 41 are supplied to a matrix 43 to produce FL4 = L + $l$R and BL4 = L − $l$R. A signal R and an output signal $r$L of the variable gain amplifier 42 is supplied to a matrix 44 to produce FR4 = R + $r$L and BR4 = R − $r$L. Outputs FL1 and FL4, FR1 and FR4, BL1 and BL4, and BR1 and BR4 are additively combined, at a predetermined amplitude ratio, at adders 45 to 48 respectively to produce outputs FL5, FR5, BL5 and BR5 i.e.

$$FL5 = 1/\sqrt{2}\ \{(1 + \sqrt{2})L + R + f(L - R) + \sqrt{2}lR\}$$

$$FR5 = 1/\sqrt{2}\ \{(1 + \sqrt{2})R + L - f(L - R) + \sqrt{2}rL\}$$

$$BL5 = 1/\sqrt{2}\ \{(1 + \sqrt{2})L - R + b(L + R) - \sqrt{2}lR\}$$ and $$BR5 = 1/\sqrt{2}\ \{(1 + \sqrt{2})R - L + b(L + R) - \sqrt{2}rL\}.$$

These outputs are mixed with corresponding outputs from a second variable matrix. With the variable matrix shown in FIG. 3, the variable factors $f$, $b$ are varied to the extent ranging between 0 and 3.414, and the variable factors $r$, $l$ are varied to the extent ranging between 0 and 3.414.

Figure 4:
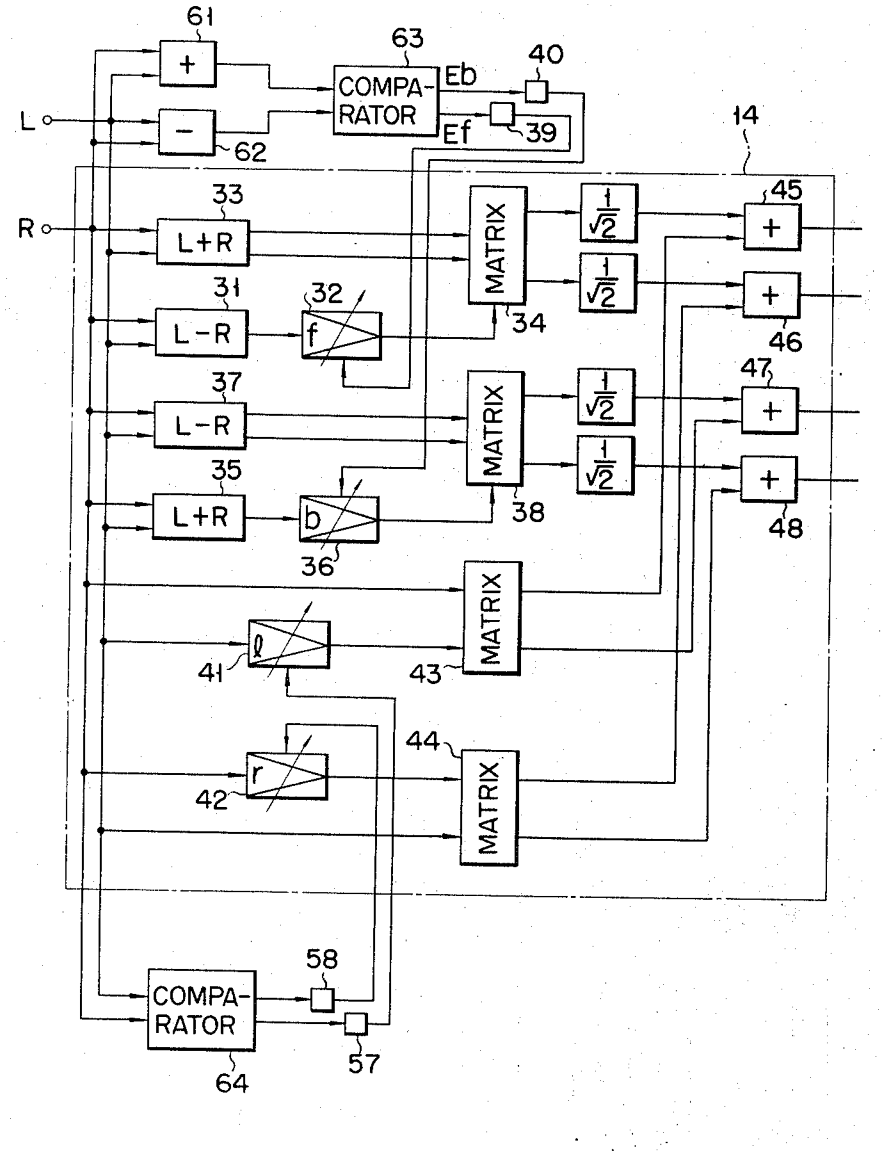
FIG. 4 is another systematic representation in which level comparators are used as control units in the variable matrix circuit of FIG. 3.

In the embodiments of FIGS. 2 and 3, use is made, as a control unit, of a phase discriminator. A level comparator may also be used. FIG. 4 shows an example in which a level comparator is used in the variable matrix of FIG. 3. To control the variable factors $f$ and $b$ a sum signal of signals L and R is produced at a matrix 61 and a difference signal of signals L and R is produced at a matrix 62. A level difference between the sum signal and the difference signal is compared at a level comparator 63. To control the variable factors $r$ and $l$ use is made of a level comparator 64 for comparing a level difference between signals L and R.

The arrangement and operation of the above-mentioned variable matrix, as well as those of the phase comparator and level comparator, are set forth in detail in the above-mentioned co-pending application and any further description is therefore omitted.

As another matrix four-channel system there is known the arrangement using the following two channel signals L and R:

$L = FL + 0.7RR - j0.7RL$ $R = FR + j0.7RR - 0.7RL$

Figure 5:
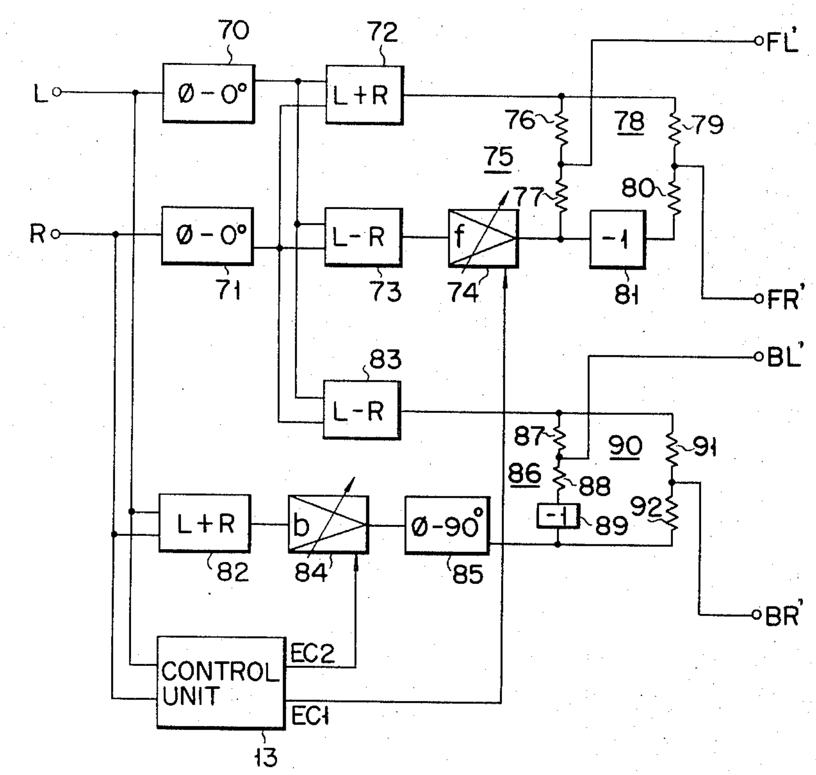
FIG. 5 is a systematic illustration applicable to the other matrix four channel system.

As a variable matrix for the matrix four channel system such a decoder as in FIG. 5 is disclosed in detail in the co-pending U.S. application Ser. No. 317,134, filed Dec. 21, 1972, entitled DECODER FOR USE IN MATRIX FOUR-CHANNEL SYSTEM now U.S. Pat. No. 3,783,192. This invention can be applied to such a decoder. To explain in brief a decoder shown in FIG. 5, two channel signals L and R are phase shifted a reference amount by phase shifters 70 and 71. A sum signal L + R and a difference signal L − R are formed by a first matrix 72 and a second matrix 73. The amplitude of the difference signal L − R is controlled by a variable gain amplifier 74 which is supplied with a control output EC1 from a control unit 13. An output $f(L-R)$ of the amplifier 74 and an output L + R of the matrix 72 are added together at an adder 75 including equal resistors 76 and 77 to produce one, i.e. FL′, of front output signals, and the output $f(L-R)$ of the amplifier 74 and the output L + R of the matrix 72 are subtractively combined at the subtractor 78 including equal resistors 79 and 80 and an inverter 81 to produce the other one, i.e. FR′, of the front output signals. A sum signal L + R is produced at a matrix 82 and a difference signal L − R is produced at a matrix 83. The amplitude of the output L + R of the matrix 82 is controlled by a variable gain amplifier 84 which is supplied with a control output EC2 from the control unit 13. An output L + R of the matrix 82 is phase-shifted by a phase shifter 85 having a phase shift characteristic −90° displaced from the phase shift characteristics of the phase shifters 70 and 71. And a 90° phase difference is introduced between an output L − R of the matrix 83 and an output L + R of the matrix 82.

A 90° phase-shifted output L + R of an amplifier 84 and an output L − R of the matrix 83 are subtractively combined at a subtractor 86 including equal resistors 87 and 88 and an inverter 89 to produce one, i.e. BL′, of rear output signals, and the 90° phase shifted output L + R of the amplifier 84 and the output L − R of the matrix 83 are additively combined at an adder 90 including equal resistors 91 and 92 to produce the other one, i.e. BR′ of the rear output signals. The use of such a decoder permits improved separation particularly between a center-front channel and a center-back channel.

What we claim is:

1. A decoder for use in a multi-directional acoustic system in which at least four directional audio input signals associated with front-left and right channels and rear-left and right channels are encoded into two channel signals and the two channel signals are decoded into at least four audio output signals, said decoder comprising:

filter means for dividing said two channel signals into at least first and second frequency bands;

at least one first control unit connected to receive the two channel signals of the first frequency band to generate control outputs for detecting a phase relation between the two channel signals to produce control outputs;

first variable matrix circuit means connected to receive the two channel signals of the first frequency band and adapted to generate four two-channel signal intermixed output such that relative amplitude ratios between the two channel signals are varied in response to control outputs from said control unit;

at least one second control unit connected to receive the two channel signals of the second frequency band and for detecting a phase relation between the two channel signals to produce control outputs;

second variable matrix circuit means connected to receive the two channel signals of the second frequency band and adapted to generate four two-channel signal intermixed outputs such that relative amplitude ratios between the two channel signals are varied in response to control outputs from said second control unit; and means for combining together the corresponding outputs from said first and second variable matrix circuit means.

2. A decoder according to claim 1 in which said first and second control units are adapted to generate first and second control outputs in response to a phase relation between front and rear channels, and each of said first and second variable matrix circuit means includes first means for generating a difference output of the first and second channel signals; second means for varying the amplitude of the difference signal in response to the first control output; third means for generating a sum output of the first and second channel signals; fourth means for varying the amplitude of the sum output in response to the second control output; fifth means for combining, with the same polarity, the first and second channel signals and an output of said second means; sixth means for combining the first and second channel signals and the output of the second means in a manner that the first and second channel signals are opposite in polarity to the output of said second means; seventh means for combining the first and second channel signals and the output of said second means in a manner that the second channel signal is opposite in polarity to the first channel signal and the output signal of said second means; eighth means for combining the first and second channel signals and an output of said fourth means in a manner that the first channel signal is opposite in polarity to the second channel signal and the output signal of said fourth means.

3. A decoder according to claim 2 in which said control unit includes a phase discriminator for detecting a phase difference between the two channel signals.

4. A decoder according to claim 2 in which said control unit includes a level comparator for detecting a phase difference between the two channel signals according to a level difference between a sum and a difference signal of the two channel signals.

5. A decoder according to claim 1 further comprising third and fourth control units, and wherein each of said first and second control units is adapted to produce first and second control outputs in response to a phase relationship between front and rear channels, and each of said third and fourth control units is adapted to produce third and fourth control outputs in response to a phase relationship between left and right channels, and wherein each of said first and second variable matrix circuit means includes first means for generating a difference signal of the first and second channel signals; second means for varying the amplitude of the difference signal in response to the first control output; third means for generating a sum signal of the first and second channel signals; fourth means for varying the amplitude of the sum signal in response to the second control output; fifth means for varying the amplitude of the first channel signal in response to the third control output; sixth means for varying the amplitude of the second channel signal in response to the fourth control output; seventh means for combining, with the same polarity and at a predetermined relative amplitude ratio, the first and second channel signals, output signal of said second means and output signal of said sixth means; eighth means for combining the first and second channel signals, output signal of said second means, and output signal of said fifth means at a predetermined relative amplitude ratio and in a manner that the output signal of said second means is opposite in polarity to the first and second channel signals and output signal of said fifth means; ninth means for combining the first and second signals, output signal of said fourth means and output signal of said sixth means at a predetermined relative amplitude ratio and in a manner that the first channel signal and output signal of said fourth means are opposite in polarity to the second channel signal and output signal of said sixth means; tenth means for combining the first and second channel signals, output of said fourth means and output signal of said fifth means and at a predetermined relative amplitude ratio and in a manner that the second channel signal and output signal of said fourth means are opposite in polarity to the first channel signal and output signal of said fifth means.

6. A decoder according to claim 5 in which each of said third and fourth control units includes a level comparator for detecting a level difference between the first and second channel signals.

7. A decoder according to claim 5 in which each of said third and fourth control units includes a phase shifting means for introducing a 45° phase difference between the first and second channel signals; an adder means for producing a sum signal of the outputs of said phase shifting means; a subtractor means for producing a difference signal of the outputs of said phase shifting means; and a phase discriminator means for detecting a phase difference between the sum signal and the difference signal.

8. A decoder according to claim 1 in which said first and second control units are adapted to generate first and second control outputs in response to a phase relation between the front and rear channels and each of said first and second variable matrix circuit means includes first and second phase shifting means for phase shifting the two channel signals a reference amount; first means for producing a difference signal of the phase-shifted two channel signals; second means for controlling the amplitude of the difference signal based on the first control output; third means for additively combining an output signal of said second means and the phase-shifted two channel signals; fourth means for subtractively combining the output signal of said second means and phase-shifted two channel signals; fifth means for producing a sum signal of the two channel signals; sixth means for controlling the amplitude of an output of said fifth means based on the second control output; third phase shifting means connected in circuit with said sixth means and adapted to introduce a 90° phase difference between the output signal of said fifth means and the phase-shifted two channel signals; seventh means for subtractively combining an output signal of said sixth means and phase-shifted two channel signals opposite in polarity thereto; and eighth means for additively combining an output signal of said sixth means and phase-shifted two channel signals opposite in polarity thereto.

* * * * *

PO-1050
(5/69)

UNITED STATES PATENT OFFICE
CERTIFICATE OF CORRECTION

Patent No. 3,836,715 Dated September 17, 1974

Inventor(s) Ryosuke Ito and Susumu Takahashi

It is certified that error appears in the above-identified patent and that said Letters Patent are hereby corrected as shown below:

Column 2, line 56, "with" should be --within--

Column 4, line 36, after "control" insert --unit--

Column 6, line 25, Claim 1, "output" should be --outputs--.

Signed and sealed this 14th day of January 1975.

(SEAL)
Attest:

McCOY M. GIBSON JR.
Attesting Officer

C. MARSHALL DANN
Commissioner of Patents